No. 665,215. Patented Jan. 1, 1901.
B. S. HARRIS.
WINDOW WASHER.
(Application filed Apr. 12, 1900.)
(Model.)
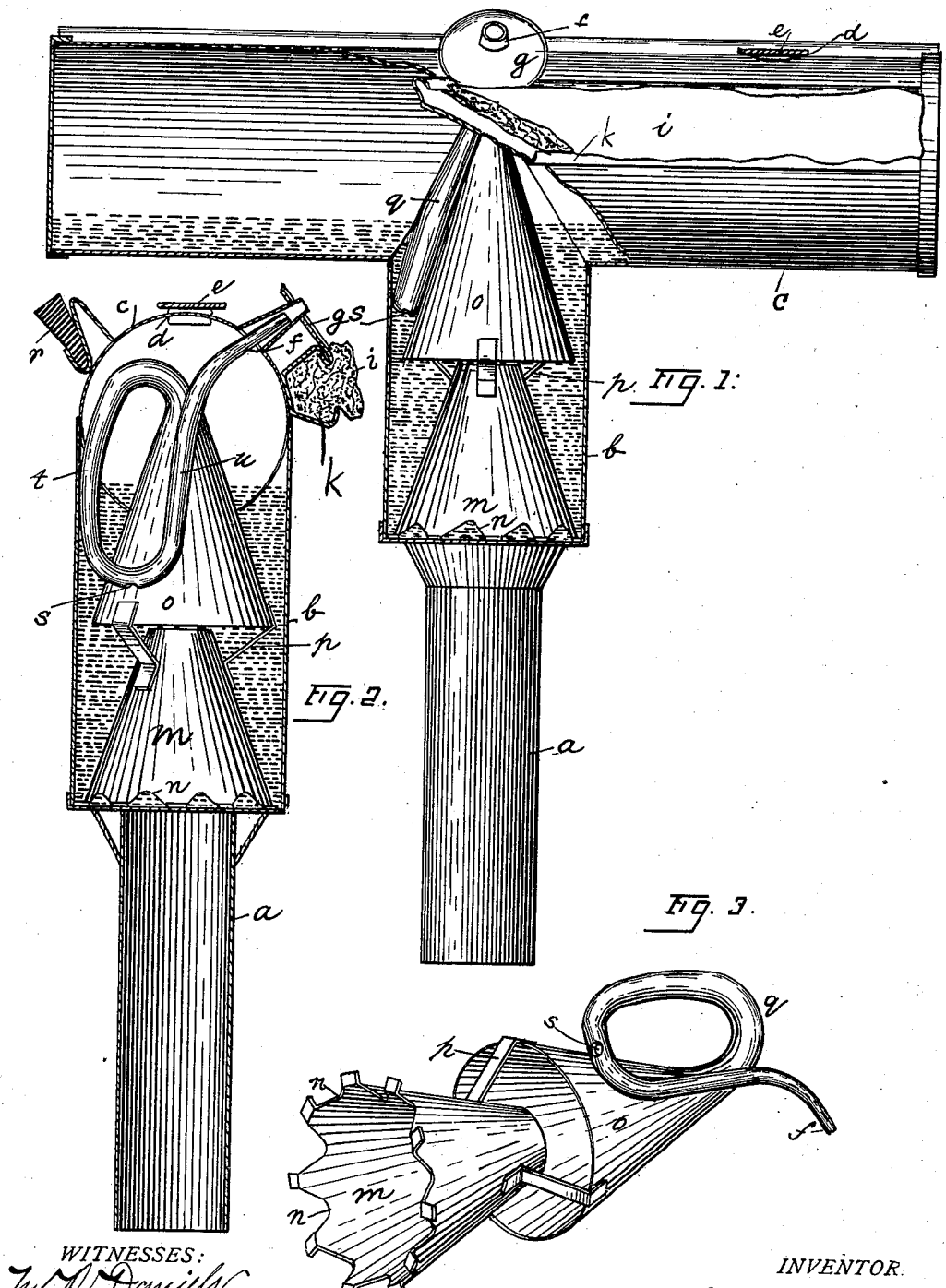
WITNESSES:
INVENTOR.
Brit S. Harris
BY
Francis M. Wright
ATTORNEY.

UNITED STATES PATENT OFFICE.

BRIT S. HARRIS, OF OAKLAND, CALIFORNIA.

WINDOW-WASHER.

SPECIFICATION forming part of Letters Patent No. 665,215, dated January 1, 1901.

Application filed April 12, 1900. Serial No. 12,584. (Model.)

*To all whom it may concern:*

Be it known that I, BRIT S. HARRIS, a citizen of the United States, residing at Oakland, in the county of Alameda and State of California, have invented certain new and useful Improvements in Window-Washers, of which the following is a specification.

My invention relates to improvements in window-washers, the object of my invention being to provide a device of this character, by means of which water may be supplied in small quantities at the will of the operator to a strip of felt or similar substance adapted to distribute water upon the window-pane and one, moreover, in which the water to be so distributed shall be contained in the reservoir or receptacle in such manner that the device may be inverted at any time without spilling the water therefrom.

My invention therefore resides in the novel construction, combination, and arrangement of parts for the above ends hereinafter fully specified, and particularly pointed out in the claims.

In the accompanying drawings, Figure 1 is a front elevation of my improved device, the casing being partly broken away to show the construction of the interior. Fig 2 is a transverse central section thereof, the cones and tube in the interior being shown in the side elevation; and Fig. 3 is a perspective view of the cones and tube removed from the apparatus.

Referring to the drawings, $a$ represents the stem of the device, which is made hollow to fit onto the end of a long wooden handle in the usual manner. Said stem $a$ carries a cylindrical cup $b$, upon which is mounted a horizontal cylinder $c$, communicating with said cup $b$ and forming one chamber therewith. Said cylinder $c$ is closed at both ends, and the chamber formed by the cylinder and cup is a closed chamber, except for the opening $d$ in the upper surface of the cylinder $c$ for pouring water into the water-chamber, which opening is adapted to be closed by a suitable cap $e$ and also an opening for the nozzle $f$ of the discharge-tube. The water from said nozzle $f$ is distributed by means of a small plate $g$, surrounding said nozzle and extending to the upper side of a strip of felt $i$, which is clamped between lips or plates $k$, extending longitudinally of the cylinder $c$.

When the device is held in an upright or operative position, the water will fill the cup $b$ and partly fill the cylinder $c$. When it is desired to project a small quantity of water onto the window-pane above the strip of felt, the operator will impart to the device a quick upward movement, which will cause the water to flow upward from the bottom of the cup $b$ through a vertical cone $m$, secured at its lower edge to the bottom of the cup $b$, said edge being scalloped, as shown at $n$, to permit the free passage of the water under said edge into said cone. Under said sudden upward impulse the water flows into the top of said cone $m$ and thence into a second or upper cone $o$, into the lower flaring end of which the upper narrow end of the lower cone $m$ is directed, said cone $o$ being supported in its position upon the cone $m$ by suitable stays $p$. The upward impulse given to the device will cause the water to flow up through said upper cone and thence into a bent discharge-tube $q$, leading from the upper narrow end of the cone $o$, first in a downward direction and then upwardly, the upper end of said tube terminating in the nozzle $f$. It will thus be seen that any amount of water as may be desired may be projected upon the window-pane at the will of the operator until substantially all the water has been exhausted from the cup $b$.

$r$ is a strip of rubber secured longitudinally of the casing in the usual manner for drying the window-pane after it has been washed by means of the moistened strip of felt.

At the lowest point of the tube $q$ there is an aperture $s$, which permits all the water in said tube which was not projected through the nozzle to drop back into the main supply. By this construction it will be seen that the device may be inverted without permitting any water to escape through the nozzle $f$. When the device is inverted, the water will flow out of the cup $b$ into the cylinder $c$ and will also flow from both ends of the cone $m$. The water in the cone $o$ will also for the most part flow back into the horizontal cylinder, and the amount of water which does not so flow back will not be sufficient to fill said cone and the portion $t$ of the tube $q$ to such a level as to permit it to overflow into the terminal portion $u$ of said tube.

Having thus fully described my invention, what I claim, and desire to secure by Letters Patent, is—

1. In a window-washer, the combination with a suitable water-chamber, of a series of cones in line, the uppermost cone terminating in a tube, said tube discharging on the outside of said chamber, substantially as described.

2. In a window-washer, the combination with a water-chamber comprising a horizontal cylinder and a vertical cylinder connected therewith, of a cone extending vertically through said horizontal cylinder, open at its lower or larger end, and a tube bent first downwardly and then upwardly, and extending through the casing of said chamber, substantially as described.

3. In a window-washer, the combination of a vertical cup, a horizontal cylinder mounted transversely thereon to form a water-chamber, a cone converging upwardly and mounted in said vertical cup, a second cone into which the lower cone discharges, and a bent tube into which the upper end of said upper cone discharges, said tube discharging through the casing of said horizontal cylinder, substantially as described.

4. In a window-washer, the combination, with a horizontal cylinder, of a cone mounted therein converging upwardly, and a tube leading from the upper end of said cone, first downwardly, and then upwardly, and discharging through said cylinder, said tube being apertured at its lowest portion, substantially as described.

5. In a window-washer, the combination of a vertical cup, a horizontal cylinder mounted transversely thereon to form a water-chamber, a cone converging upwardly and mounted in said vertical cup, a second cone into which the lower cone discharges, and a tube leading from the upper end of said cone, first downwardly, and then upwardly, and discharging through said cylinder, said tube being apertured at its lowest portion, substantially as described.

In witness whereof I have hereunto set my hand in the presence of two subscribing witnesses.

B. S. HARRIS.

Witnesses:
FRANCIS M. WRIGHT,
A. L. WELLS.